Figure 1:
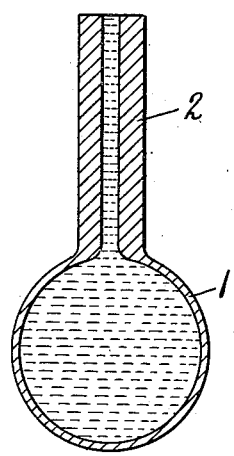

A. J. LOEPSINGER.
METHOD FOR PREPARING GLASS BULBS FOR AUTOMATIC SPRINKLERS.
APPLICATION FILED JULY 3, 1912.

1,199,088.

Patented Sept. 26, 1916.

WITNESSES.
J. H. Thurston
C. G. Bradley

INVENTOR.
Albert J. Loepsinger,
By Wilmarth H. Thurston,
ATTORNEY.

UNITED STATES PATENT OFFICE.

ALBERT J. LOEPSINGER, OF PROVIDENCE, RHODE ISLAND, ASSIGNOR TO GENERAL FIRE EXTINGUISHER COMPANY, OF NEW YORK, N. Y., A CORPORATION OF NEW YORK.

METHOD FOR PREPARING GLASS BULBS FOR AUTOMATIC SPRINKLERS.

1,199,088.          Specification of Letters Patent.          Patented Sept. 26, 1916.

Application filed July 3, 1912. Serial No. 707,470.

*To all whom it may concern:*

Be it known that I, ALBERT J. LOEPSINGER, of the city and county of Providence and State of Rhode Island, have invented a certain new and useful Method for Preparing Glass Bulbs for Automatic Sprinklers; and I do hereby declare the following specification, taken in connection with the accompanying drawings, forming a part of the same, to be a full, clear, and exact description thereof.

In an application of even date Serial No. 707,467 I have shown and described an automatic sprinkler of that type which embodies in its construction a frangible vessel having expansible contents and which is caused to be opened by the expansive or explosive force of the contents of such frangible vessel induced by the action of heat. The preferred form of frangible vessel for use in such an automatic sprinkler consists of a glass bulb with an elongated neck.

The present invention relates to the preparation of such glass bulbs for use in automatic sprinklers of the type referred to, and the invention consists in a novel method of preparing such bulbs, which method is illustrated in the accompanying drawings which will be described in connection therewith.

Referring to the drawings, Figures 1 to 7 inclusive are sectional views of a bulb illustrating the several steps of the method hereinafter described.

Figure 2:
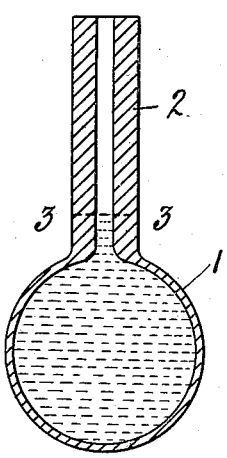
Figure 3:
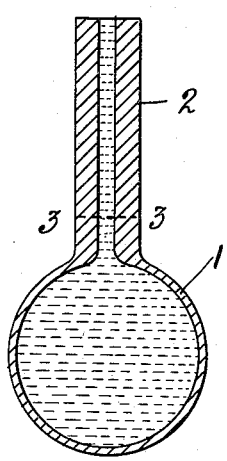
Figure 4:
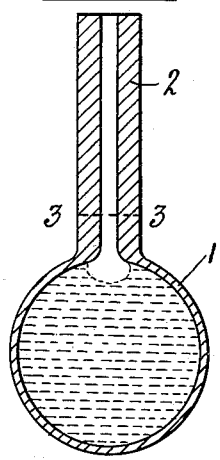
Figure 5:
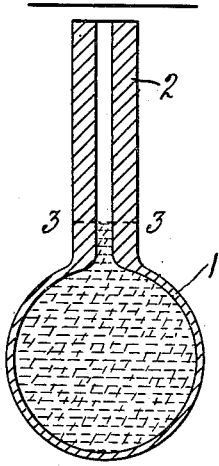

The frangible vessel comprises a glass bulb 1 provided with an elongated neck 2. A sufficient quantity of liquid, preferably water, is placed in the bulb so that when the same is heated up to a desired temperature, as for example, 160° Fah., the bulb and its elongated neck will be completely filled with the liquid at such high temperature, as shown in Fig. 1. The bulb and its contents are then cooled to normal temperature, as for example 70° Fah., which will cause a corresponding lowering of the level of the column of liquid in the neck of the bulb, as shown in Fig. 2. A mark indicated by the dotted line 3—3 in Figs. 2 to 7, inclusive, is then made upon the exterior of the neck at the level of the column of liquid therein. The bulb and its contents are then heated up to a point considerably above the point at which it is desired the sprinkler shall open, as for example up to 200° Fah. This has the effect to expel a certain portion of the liquid, because the bulb and neck were filled therewith when heated up to 160° Fah., the bulb and neck being still completely filled, as shown in Fig. 3. The bulb and its contents are then again cooled to normal temperature, at which temperature the level of the liquid will, by reason of the fact that a portion thereof has been expelled, be correspondingly lower than the mark which was made upon the neck, and it may be assumed that the level at this time will be somewhat below the lower end of the neck, as shown in Fig. 4. The liquid in the bulb is then charged with the gas, and preferably with ammonia gas, which is introduced through the neck into the bulb and which, becoming absorbed by or dissolved in the liquid, serves to correspondingly increase the volume of the contents. The introduction of the gas is continued until the level of the contents has risen up to the mark which has been made upon the neck, that is, up to the line 3—3, as shown in Fig. 5. As there may be some difference in the coefficient of expansion of the ammonia solution as compared with that of water, it may be desirable to make some allowance for this difference when extreme accuracy is desired, but ordinarily this will not be necessary.

Figure 6:
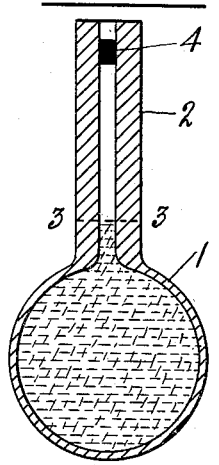
Figure 7:
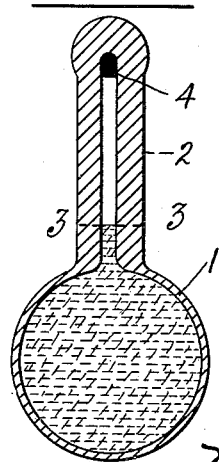

A convenient way of sealing the bulb consists in first inserting in the open end of the neck somewhat below the open end thereof a plug 4 of plaster of Paris or other suitable material, as shown in Fig. 6, and then applying heat to fuse and close the end of the neck and thus hermetically seal the bulb, as shown in Fig. 7. The plug 4 constitutes a stopper which serves when the heat is applied to prevent the escape of gas from the bulb.

By the method of preparing the bulb above described the water or other liquid is introduced into the bulb without the gas, and is charged with the ammonia or other gas within the bulb. By regulating the amount of gas introduced into the bulb a definite prescribed ratio of the gas to the liquid may be readily provided.

What I claim as my invention and desire to secure by Letters Patent is:

1. The method of filling and sealing glass bulbs which consists in first filling the bulb full of a liquid at a desired high temperature, then cooling the bulb and its contents to normal temperature, then heating the bulb and its contents to a still higher temperature, thereby discharging a part of the liquid, then again cooling the bulb and its contents to normal temperature, then introducing gas into the liquid until the level of the solution is brought up to the level of the liquid after the first cooling, and then sealing said bulb.

2. The method of filling and sealing glass bulbs which consists in first filling a bulb full of a liquid at a desired high temperature, then cooling the bulb and its contents to normal temperature, then indicating the level of the liquid, then heating the bulb and its contents to a still higher temperature, thereby discharging a part of the liquid, then again cooling the bulb and its contents to normal temperature, then introducing gas into the liquid until the level of the solution is brought up to such indication, and then sealing said bulb.

3. The method of filling and sealing glass bulbs which consists in first filling a bulb with a neck full of a liquid at a desired high temperature, then cooling the bulb and its contents to normal temperature, then making a mark on the neck of the bulb at the level of the liquid, then heating the bulb and its contents to a still higher temperature, thereby discharging a part of the liquid, then again cooling the bulb and its contents to normal temperature, then introducing gas into the liquid until the level of the solution is brought up to the mark on the neck, and then fusing said neck.

ALBERT J. LOEPSINGER.

Witnesses:
W. H. THURSTON,
J. H. THURSTON.